(No Model.) 2 Sheets—Sheet 1.
T. B. WIRE.
Cheese Vat.
No. 238,319. Patented March 1, 1881.
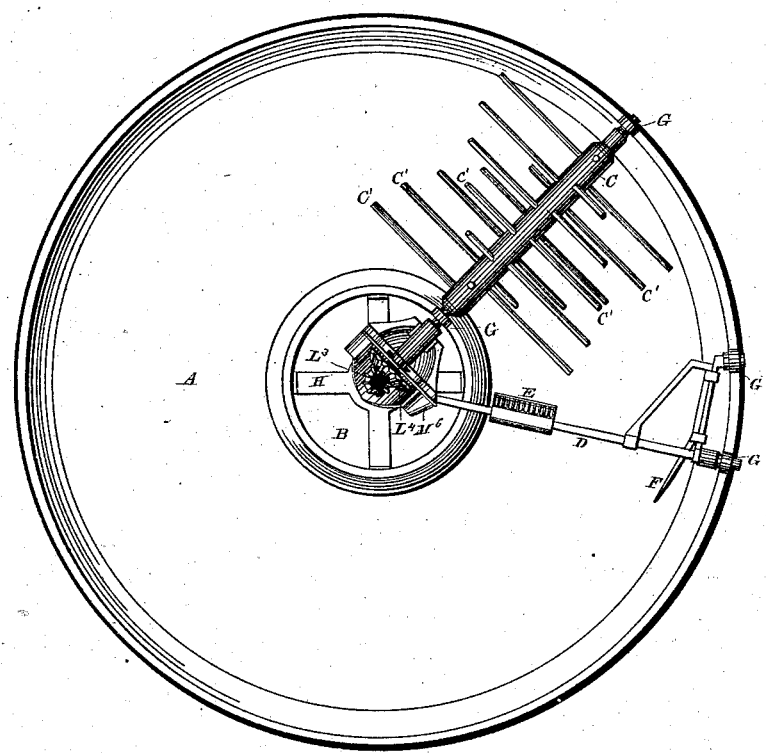
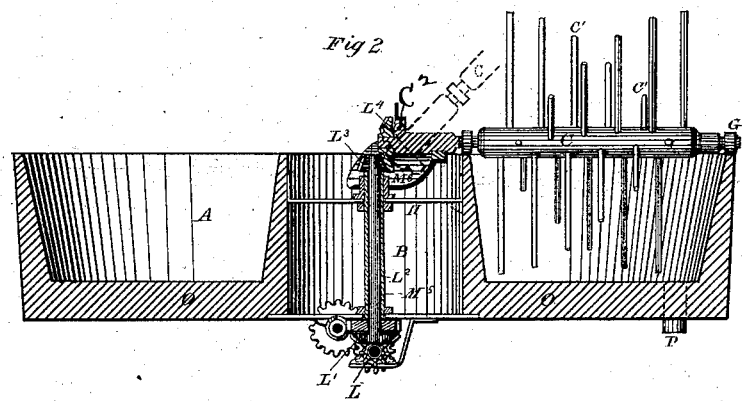
WITNESSES
J. J. Lehman
Jno. Crowell Jr
INVENTOR
Theodore B. Wire
By Leggett & Leggett
ATTORNEY (No Model.) 2 Sheets—Sheet 2.

T. B. WIRE.
Cheese Vat.

No. 238,319. Patented March 1, 1881.

WITNESSES
INVENTOR
Theodore B. Wire
By Liggett & Liggett
ATTORNEY

N. PETERS, PHOTO-LITHOGRAPHER, WASHINGTON, D. C.

UNITED STATES PATENT OFFICE.

THEODORE B. WIRE, OF LENOX, OHIO.

CHEESE-VAT.

SPECIFICATION forming part of Letters Patent No. 238,319, dated March 1, 1881.

Application filed September 23, 1880. (No model.)

*To all whom it may concern:*

Be it known that I, THEODORE B. WIRE, of Lenox, in the county of Ashtabula and State of Ohio, have invented certain new and useful Improvements in Cheese-Vats; and I do hereby declare the following to be a full, clear, and exact description of the invention, such as will enable others skilled in the art to which it pertains to make and use it, reference being had to the accompanying drawings, which form part of this specification.

Figure 3:
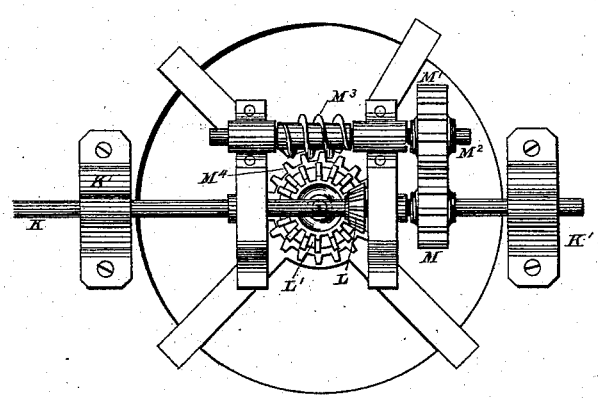
Figure 4:
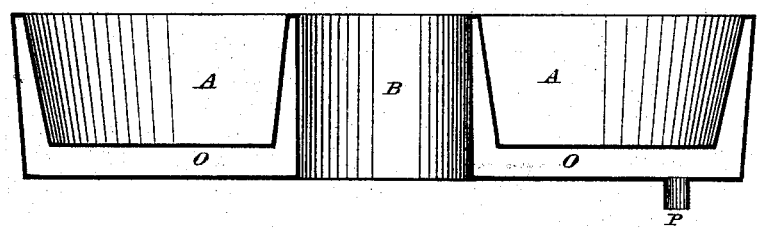
Figure 5:
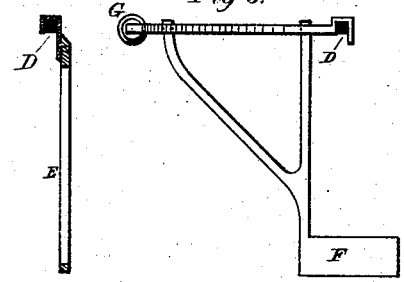

In the drawings, Figure 1 represents, in plan view, one embodiment of my invention. Fig. 2 is a longitudinal section thereof. Fig. 3 is an inverted view thereof, showing the mechanism upon the under side of the device shown in Figs. 1 and 2. Fig. 4 is a sectional view, illustrating the heating-chamber below the milk-pan. Fig. 5 is a section view, illustrating one manner of detachably attaching the curd-knife and the scraper to their operating-arm.

A is a pan or vat, and B is a central opening within the said pan or vat, within which, or from which, central opening the mechanism is placed or extends for operating the cheese-making devices.

C is an agitator, which in the device illustrated is constructed to revolve on its own axis in the same direction that it is driven bodily around the vat A.

D is an arm which is also carried radially around the pan or vat A, and to this arm may be detachably attached a curd-knife, E, constructed to cut the curd either in vertical or horizontal lines, according to the arrangement of its blades. A scraper, F, may also be detachably attached to the arm D, for clearing the bottom near the rim of the vat from curd, which would otherwise stick to it.

The shafts of the agitator C and of the arm D may be provided with anti-friction rollers G, which shall rest upon the upper edge of the vat-rim, and serve to support and reduce the friction of the agitator and the arm D.

The agitator is provided with radial fingers $C'$, which may be arranged in spiral series around the agitator-shaft, and these series may be four, six, or eight (more or less) in number, according to necessity. In practical use I have found eight spiral series of these fingers $C'$ to serve a very useful purpose.

I shall now proceed to the description of mechanism for operating the agitator C and the arm D that carries the curd-knives and scraper. This actuating mechanism, as already mentioned, is located in or operates from the center of the vat A.

H is any suitable frame or support for holding the mechanism about to be specified, and this frame is attached to the bottom of the tank and to the inside walls of the central opening, B.

K is a shaft, to which the initial power for operating the mechanism of my device is applied. This shaft K is journaled to the bottom of the vat A and frame H at the points $K'$. Upon this shaft are placed the pinions L and M. The pinion L is of the bevel-gear type and meshes with the bevel-gear wheel $L'$. The bevel-gear wheel $L'$ imparts its rotary movement to the upright shaft $L^2$, upon the upper end of which is fixed a miter-pinion, $L^3$. This miter-pinion $L^3$ meshes with the miter-gear wheel $L^4$, which is fixed upon and imparts axial revolution to the shaft of the agitator C. The pinion M upon the shaft K meshes with the pinion $M'$, which is fixed upon and imparts its revolution to a shaft, $M^2$. This shaft $M^2$ carries the thread $M^3$ of a worm-gear. The worm $M^3$ meshes with the worm-gear wheel $M^4$, which is fixed upon and imparts its revolution to the hollow shaft $M^5$, which surrounds the shaft $L^2$, and which is journaled within the frame H. This hollow shaft $M^5$ carries at its upper end a suitable frame, $M^6$, and within this frame is journaled and from it extends the shaft of the agitator C. The gear mechanism and connection just specified impart to the shafts $L^2$ and $M^5$ motions opposite to each other. It also results in imparting to the shaft $L^2$ a rotation more rapid than that of the shaft $M^5$.

As will be easily perceived, the operation of the mechanism above specified will be as follows: As the main shaft K is revolved the gear-wheels L M are revolved with it. The gear L, through the wheel $L'$ and shaft $L^2$, pinion $L^3$, and gear-wheel $L^4$, will impart to the shaft of the agitator C an axial rotation, while the revolution of the gear-wheels M $M'$, the shaft $M^2$, worm-gear $M^3$ and $M^4$, and hollow shaft $M^5$, will impart a slow radial revolution to the frame $M^6$, and to the agitator C attached to and carried with said frame. The arm D is also attached to and carried by the frame $M^6$, and is thereby given a simple revolution about the center of the vat A.

O is a heating-space below the floor of the vat A. This heating-space may be constructed either to accommodate hot water or steam, or pipes through which hot water or steam can be carried to heat the contents of the vat A.

The application and operation of my device, in the manufacture of cheese, may be described as follows: Milk from the dairy is deposited in the pan A. Heat is applied beneath the floor of the vat until the milk is raised to a degree of from 83° to 85° Fahrenheit, when rennet in suitable quantity is applied for its well-known coagulating purposes. During the heating of the milk the agitator C should be kept in operation to prevent scorching, which might otherwise happen, and when the rennet has performed its function the shaft of the agitator C, which is vertically pivoted to the frame $M^6$, as indicated at $C^2$, is raised up, as shown by the dotted lines in Fig. 2 of the drawings. Curd-knives E, of any suitable construction, are now attached to the arm D for vertically and horizontally dividing the coagulated curd, immediately after which the agitator C is brought down again into operation to prevent the caking or burning of the curd while cooking. The scraper F performs its function of clearing the curd from the bottom of the vat at the same time. In addition to the stirring function performed by the agitator C, it effects another result no less important, and that is, a movement of the entire body of the curd contained in the vat A in a direction opposite to the radial movement of the agitator and parallel with its motion of axial revolution. This not only tends to prevent caking and burning of the curd, but it enables the agitator C, during each of its revolutions, to operate upon any given part of the contained curd two or three times instead of once, as would be the case if it were not for the current or general revolution imparted to the whole body of the whey and curd. After the curd-knives and the agitator have performed their function, as described, the whey is drained through the vent P. This vent P is provided with any suitable strainer or screen which will permit of the escape of the whey without a waste or escape of the curd, and after the whey has been drained from the curd the agitator is again applied with increased movement, until the curd is in a finished condition and ready to put to press.

A circular vat with the same capacity is more cheaply constructed than any other. The central opening brings the contents of the vat within the reach of the operator from the outside; whereas, if there was no central opening, the vat, if made in circular form, would have to be made small enough for the operator to reach from the outside, substantially, across the bottom, which would limit its capacity, while a vat constructed with a central opening can be made of any desired size and adapted to be used by an operator by simply placing the wall of the opening within his reach from the outside.

What I claim is—

1. In a cheese-vat, the combination, with a vertical rotary shaft located at the central portion of the vat, and an agitator, one end of whose shaft is journaled in a bearing secured to said central shaft, of an independent rotary shaft geared to the agitator-shaft, said parts being adapted to cause the agitator to revolve about the center of the vat and to rotate about its own axis, substantially as set forth.

2. In a cheese vat, the combination, with a vertical rotary tubular shaft located at the central portion of the vat, and an agitator having one end of its shaft journaled in a bearing secured to the upper extremity of said tubular shaft, of an independent rotary shaft inclosed in the tubular shaft and gearing with the agitator-shaft, said parts being adapted to cause the agitator to rotate on its axis in the same direction in which it revolves about the center of the vat, substantially as set forth.

3. In a cheese-vat, the combination, with a driving-shaft gearing with a counter-shaft and with the lower extremity of a vertical rotary shaft, and an agitator whose shaft gears with the upper extremity of said vertical shaft, of a tubular shaft inclosing the latter shaft and provided at its upper extremity with a bearing in which one end of the agitator-shaft is journaled, substantially as set forth.

4. In a cheese-vat, the combination, with a driving-shaft located beneath a vat and having bevel-gearing with the lower extremity of a vertical rotary shaft, and an agitator, one end of whose shaft gears with the upper extremity of said vertical shaft, of a counter-shaft having spur-gearing with the driving-shaft, and having worm-gearing with the lower extremity of a tubular shaft inclosing the previously-mentioned vertical shaft, and an agitator, one end of whose shaft is journaled in a bearing secured to the upper extremity of said tubular shaft, substantially as set forth.

5. In a cheese-vat, the combination, with a vat and an agitator, of a support to which one end of the agitator-shaft is pivoted, said agitator being thereby adapted to be raised from the vat in vertical tilting movement, substantially as set forth.

6. In a cheese-vat, the combination, with a vat provided with a central opening, and a vertical rotary shaft fitted in the latter, of an agitator having one end of its shaft journaled in a bearing secured to the vertical shaft at a point within the vat-opening, and a frame supporting said vertical shaft in position in the center of the opening, substantially as set forth.

In testimony whereof I have signed my name to this specification in the presence of two subscribing witnesses.

THEODORE B. WIRE.

Witnesses:
JNO. CROWELL, Jr.,
ALBERT E. LYNCH.